US009860311B1

(12) United States Patent
Rohde et al.

(10) Patent No.: US 9,860,311 B1
(45) Date of Patent: Jan. 2, 2018

(54) CLUSTER MANAGEMENT OF DISTRIBUTED APPLICATIONS

(71) Applicant: EMC IP Holding Company LLC, Hopkinton, MA (US)

(72) Inventors: Henning K. Rohde, Seattle, WA (US); Sunil Soman, Seattle, WA (US); Surinder P. Singh, Bellevue, WA (US); Hui Li, Bellevue, WA (US); Carl R. Erhard, Holden, MA (US); Yasmine Alperovitch, Hopkinton, MA (US); Shane M. Sullivan, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 115 days.

(21) Appl. No.: 14/857,177

(22) Filed: Sep. 17, 2015

(51) Int. Cl.
*G06F 15/173* (2006.01)
*H04L 29/08* (2006.01)
*G06F 11/34* (2006.01)
*G06F 15/16* (2006.01)

(52) U.S. Cl.
CPC .......... *H04L 67/10* (2013.01); *G06F 11/3433* (2013.01); *G06F 11/3442* (2013.01); *G06F 11/3452* (2013.01); *G06F 15/161* (2013.01)

(58) Field of Classification Search
CPC .... H04L 67/10; G06F 11/3433; G06F 15/161; G06F 11/3442; G06F 11/3452
See application file for complete search history.

(56) References Cited

U.S. PATENT DOCUMENTS

| | | | | |
|---|---|---|---|---|
| 8,458,717 B1* | 6/2013 | Keagy | ...... | G06F 8/63 718/104 |
| 8,706,798 B1* | 4/2014 | Suchter | ...... | G06F 9/5038 709/202 |
| 8,874,705 B1* | 10/2014 | Satish | ...... | G06F 11/008 709/220 |
| 2003/0009511 A1* | 1/2003 | Giotta | ...... | G06F 9/465 709/201 |
| 2005/0005012 A1* | 1/2005 | Odhner | ...... | G06Q 10/06 709/226 |
| 2005/0251567 A1* | 11/2005 | Ballew | ...... | G06F 9/5077 709/223 |
| 2006/0173984 A1* | 8/2006 | Emeis | ...... | G06F 9/5072 709/223 |
| 2007/0233843 A1* | 10/2007 | Frey-Ganzel | ...... | G06F 9/5083 709/223 |

(Continued)

*Primary Examiner* — Mohamed Wasel
(74) *Attorney, Agent, or Firm* — Daly, Crowley Mofford & Durkee, LLP (57) ABSTRACT

A method includes performing at a lifecycle manager a first process. The first process includes determining nodes in a cluster to run an application, determining a difference between a cluster goal state and a cluster actual state for the application, determining goal state for each node and sending respective goal state to agents. The method also includes performing at each agent a second process. The second process includes determining a difference between the goal state of the node and an actual state of the node, determining actions to be performed based on the difference between the goal state of the node and the actual state of the node and sending actions to resource managers to perform based on the difference between the goal state of the node and the actual state of the node.

16 Claims, 6 Drawing Sheets

(56) References Cited

U.S. PATENT DOCUMENTS

| | | | |
|---|---|---|---|
| 2007/0294197 A1* | 12/2007 | Jackson | G06F 9/505 |
| | | | 706/46 |
| 2011/0047405 A1* | 2/2011 | Marowsky-Bree | G06F 11/1415 |
| | | | 714/15 |
| 2013/0067267 A1* | 3/2013 | Tamhane | G06F 15/161 |
| | | | 714/4.11 |
| 2015/0026336 A1* | 1/2015 | Suchter | G06F 9/5038 |
| | | | 709/224 |
| 2015/0121134 A1* | 4/2015 | Wipfel | G06F 11/2094 |
| | | | 714/6.31 |
| 2015/0350318 A1* | 12/2015 | Van Assche | H04L 67/1095 |
| | | | 709/202 |
| 2016/0191611 A1* | 6/2016 | Srinivasan | H04L 67/10 |
| | | | 709/201 |
| 2016/0191613 A1* | 6/2016 | Srinivasan | H04L 67/10 |
| | | | 709/201 |

* cited by examiner

CLUSTER MANAGEMENT OF DISTRIBUTED APPLICATIONS

BACKGROUND

Managing and operating distributed applications across a cluster of machines is notoriously hard to do correctly and without unintended disruptions. Often different operations aspects collide in practice, such as upgrading the application while one machine is down and taking too many instances down at the same time. Typical solutions fall into two camps: remote execution (imperative) systems and instance count (declarative) systems. Remote execution systems are usually built around management of templates of an underlying scripting language. Instance count systems are usually built around containers or similar packaging and target stateless applications.

SUMMARY

In one aspect, a method includes performing at a lifecycle manager a first process. The first process includes determining nodes in a cluster to run an application; determining differences between a cluster goal state and a cluster actual state for the application; determining goal state for each node and sending respective goal state to agents. The method also includes performing at each agent a second process. The second process includes determining a difference between the goal state of the node and an actual state of the node; determining actions to be performed based on the difference between the goal state of the node and the actual state of the node; and sending actions to resource managers to perform based on the difference between the goal state of the node and the actual state of the node.

In another aspect, an apparatus includes electronic hardware circuitry configured to perform at a lifecycle manager a first process. The first process includes determining nodes in a cluster to run an application; determining a difference between a cluster goal state and a cluster actual state for the application; determining goal state for each node; and sending respective goal state to agents. The electronic hardware circuitry is further configured to perform at a lifecycle manager a second process. The second process includes determining a difference between the goal state of the node and an actual state of the node; determining actions to be performed based on the difference between the goal state of the node and the actual state of the node and sending actions to resource managers to perform based on the difference between the goal state of the node and the actual state of the node.

In a further aspect, an article includes a non-transitory computer-readable medium that stores computer-executable instructions. The instructions cause a machine to perform at a lifecycle manager a first process. The first process includes determining nodes in a cluster to run an application; determining a difference between a cluster goal state and a cluster actual state for the application; determining goal state for each node; and sending respective goal state to agents. The instructions cause a machine to perform at each agent a second process. The second process includes determining a difference between the goal state of the node and an actual state of the node; determining actions to be performed based on the difference between the goal state of the node and the actual state of the node; and sending actions to resource managers to perform based on the difference between the goal state of the node and the actual state of the node.

DETAILED DESCRIPTION

Described herein are techniques to manage distributed applications in a cluster of nodes. These techniques provide, for example and not limited to, (a) a flexible yet compact representation of both transitional and stationary states with precise ownership and (b) unified schemes for controlled deviations and operations that allow delegation and coordination through application negotiation.

Figure 1:
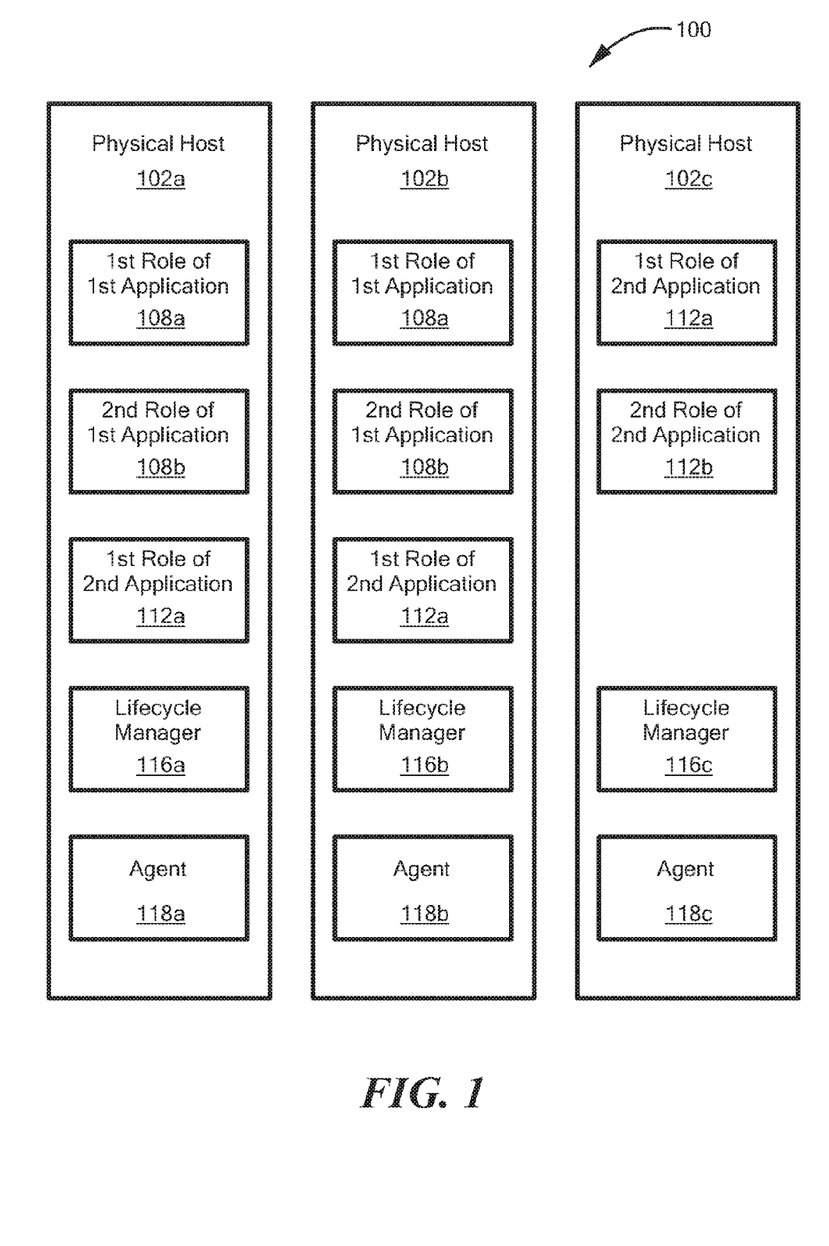
FIG. 1 is a block diagram of an example of a cluster of physical hosts.

Referring to FIG. 1, a cluster of physical hosts 100 includes a physical host 102a, a physical host 102b and a physical host 102c. An agent runs of each host (e.g., an agent 118a runs on a host 102a, an agent 118b runs on a host 102b and an agent 118c runs on a host 102c). A lifecycle manager manages one or more hosts. That is, lifecycle managers run on a subset of the physical hosts. In this example, a lifecycle manger runs on each physical host (e.g., a lifecycle manager 116a runs on the physical host 102a, a lifecycle manager 116b runs on the physical host 102b and a lifecycle manager 116c runs on the physical host 102c).

Each physical host runs one or more application roles as defined by a goal state. For example, the physical host 102a runs a first role of a first application 108a, a second role of the first application 108b and a first role of a second application 112a; the physical host 102b runs the first role of the first application 108a, the second role of the first application 108b and the first role of the second application 112a; and the physical host 102c runs the first role of the second application 112a and the second role of the second application 112b.

A role is sub-component of an application (service) that typically runs in a virtualized environment or a container. An application (service) includes of one or more roles that interact with each other. In one example, a role is user-defined.

The cluster 100 provides install services, management services and controls upgrades. The cluster 100 also provides system health, failure detection and alerting, tracks and reacts to environment changes and allows an operator to manage the system.

Figure 2A:
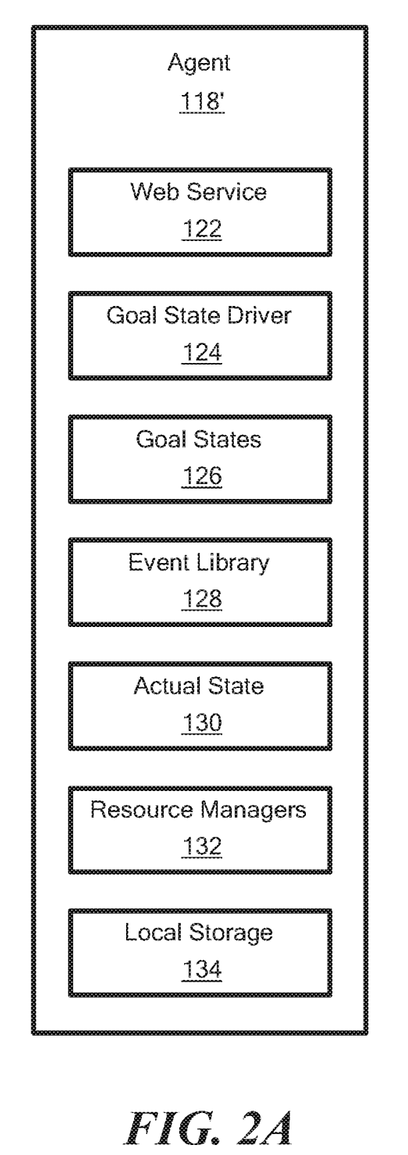
FIG. 2A is a block diagram of an example of an agent.

Referring to FIG. 2A, an example of the agents 118a-118c is an agent 118'. The agent 118' manages physical host resources (e.g., containers, disks, firewall, network and so forth) and monitors system processes.

The agent 118' has logical components that include a web service 122, a goal state driver 124, goal states 126, an event library 128, an actual state 130, resource managers 132 and local storage 134. The web service 122 handles application program interface (API) requests. The goal state driver 124 enforces goal state for application roles that it has been assigned.

The goal state 126 is the desired state that the system is trying to achieve. The goal state may include one or more of the following: service name (e.g., "object"), version (e.g., 1.1.0.0), compute (e.g., 25 nodes, image "aecdf233423ad", command-line (e.g., "./boot,sh test"), configuration files), storage (e.g., 60 500 GB SSD disks per node) and Host (e.g., firewall ports 80, 8080, 9920 on each node). Compute is the compute image that is to be run for the application (service), i.e., the actual service image itself along with parameters, configuration files, other attributes for the image.

The event library generates 128 host level events. The actual state 130 is reported by the resource managers 132. The resource managers 132 includes compute/containers, disks, firewall, network and so forth.

Figure 2B:
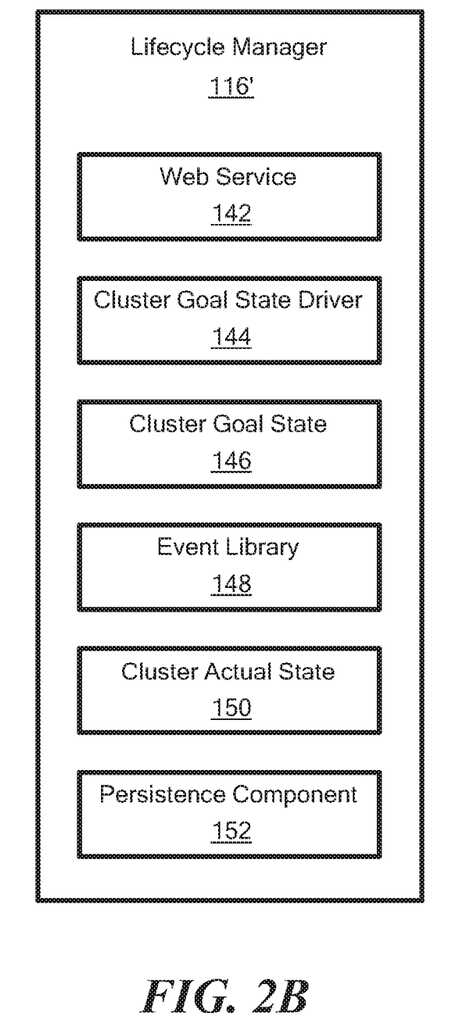
FIG. 2B is a block diagram of an example of a lifecycle manager.

Referring to FIG. 2B, an example of the lifecycle managers 116a-116c is a lifecycle manager 116'. The lifecycle manager 116' is responsible for deployment, failure detection, recovery, notification and migration. The lifecycle manager 116' establishes and manages trust between nodes (e.g., credentials, certificate authority, certificate distribution and so forth) and manages application lifecycle (e.g., install, upgrade and shutdown).

The lifecycle manager 116' has logical components that include a web service 142 to handle API requests, a cluster goal state driver 144, cluster goal state 146, an event library 148 to generate cluster level events, cluster actual state 150 and a persistence component 152. The web service 122 handles application program interface (API) requests. The cluster goal state driver 144 determines which application roles to run on which physical host and enforces this across a cluster of physical hosts. The actual state 130 is reported by the resource managers 132. The persistence component 152 includes key/value store for the cluster state.

Figure 3:
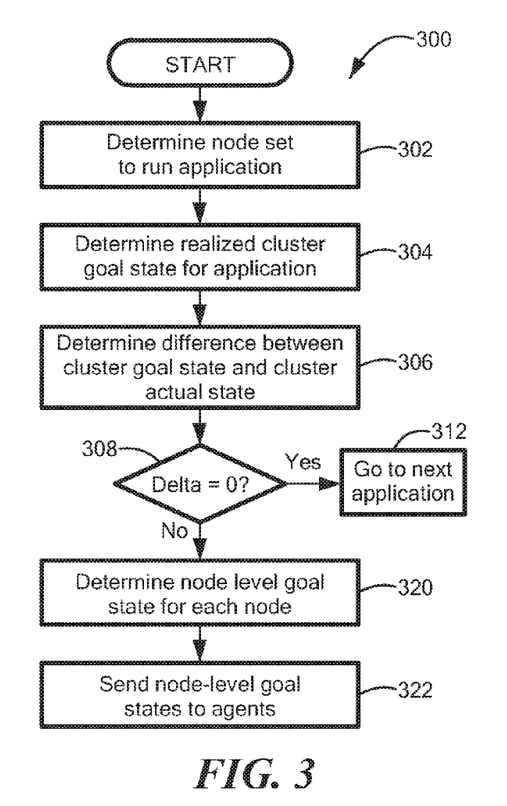
FIG. 3 is a flowchart of an example of a process executed by the lifecycle manager for each application.

Referring to FIG. 3, a process 300 is an example of a process performed by the cluster goal state driver 144. The process 300 is executed for each application. Process 300 determines a set of nodes to run the application (302). For example, the cluster goal state driver 144 determines which application roles are executed on which physical hosts.

Process 300 determines the realized goal state for the application (304). The realized goal state is a composition function over the collection of goal states for an application. It is the top (the first) part of the compute component and the union of storage and host components. Process 300 determines a difference between the cluster goal state and the cluster actual state (306). The cluster actual state is the actual state of the cluster which is an aggregation of the nodes running the application.

Process 300 determines if the difference between the cluster goal state and the cluster actual state is equal to zero and if the difference is equal to zero process 300 goes to the next application (312). If the difference is not equal to zero, process 300 determines node level goal state for each node (320) and sends the goal states to the agents (322).

Figure 4:
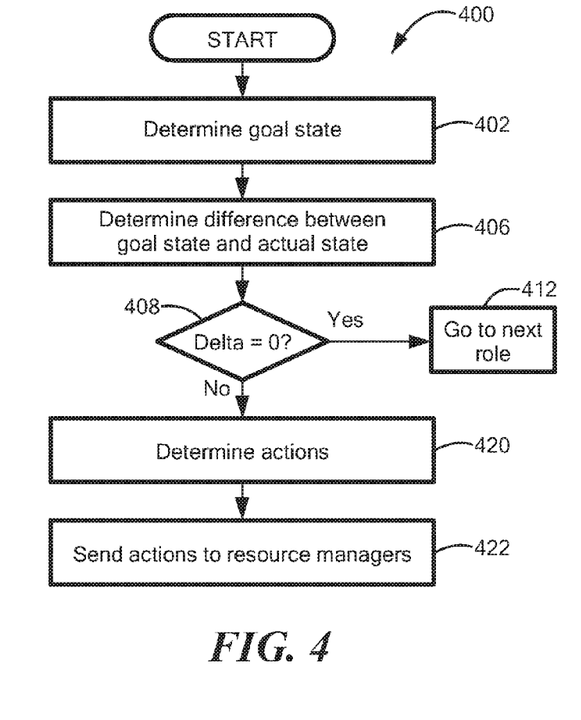
FIG. 4 is a flowchart of an example of a process executed by the agent for each application role.

Referring to FIG. 4, a process 400 is an example of a process performed by the goal state driver 124 for each application role. In one example, process 300 is triggered on every event. In another example, process 300 is triggered periodically.

Process 400 determines the realized goal state (RGS) (402). For example, RGS is equal to compute 0 union of disks, union of firewall ports and so forth. Compute 0 is the first compute definition in a collection of goal states. As used here, the top (or first) compute definition is what will be actually executed. For example, the union of disks and ports are taken and not just the first one found. Since disks and ports are additive only one compute image for any service is run at a time and that is the one that is defined as the first one in the chain of goals. The reason for this is that disks, ports, and so forth are prepared and then the goal state may be changed to move the compute image selected to be run to the first position.

Process 400 determines difference between the realized goal state and the actual state of the node (406). Process 400 determines if the difference is zero and if the difference is zero, process 400 goes to the next application role (412).

If the difference is not zero, process 400 determines the actions (420) and sends those actions to the resource managers for execution (422). The actions are for compute, storage and host. The actions will cause containers to be started, disks to be assigned, network rules to be generated and so forth.

Figure 5:
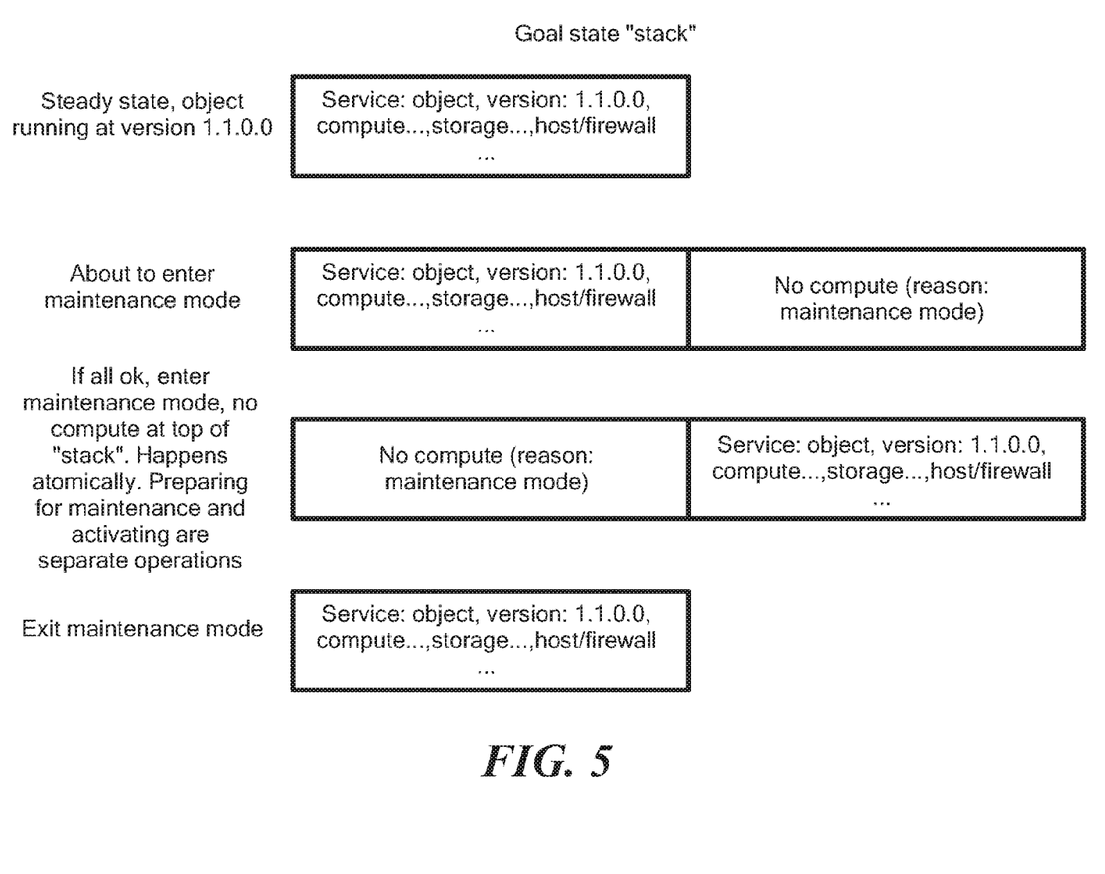
FIG. 5 is a block diagram of an example of a goal state stack during a maintenance mode.
Figure 6:
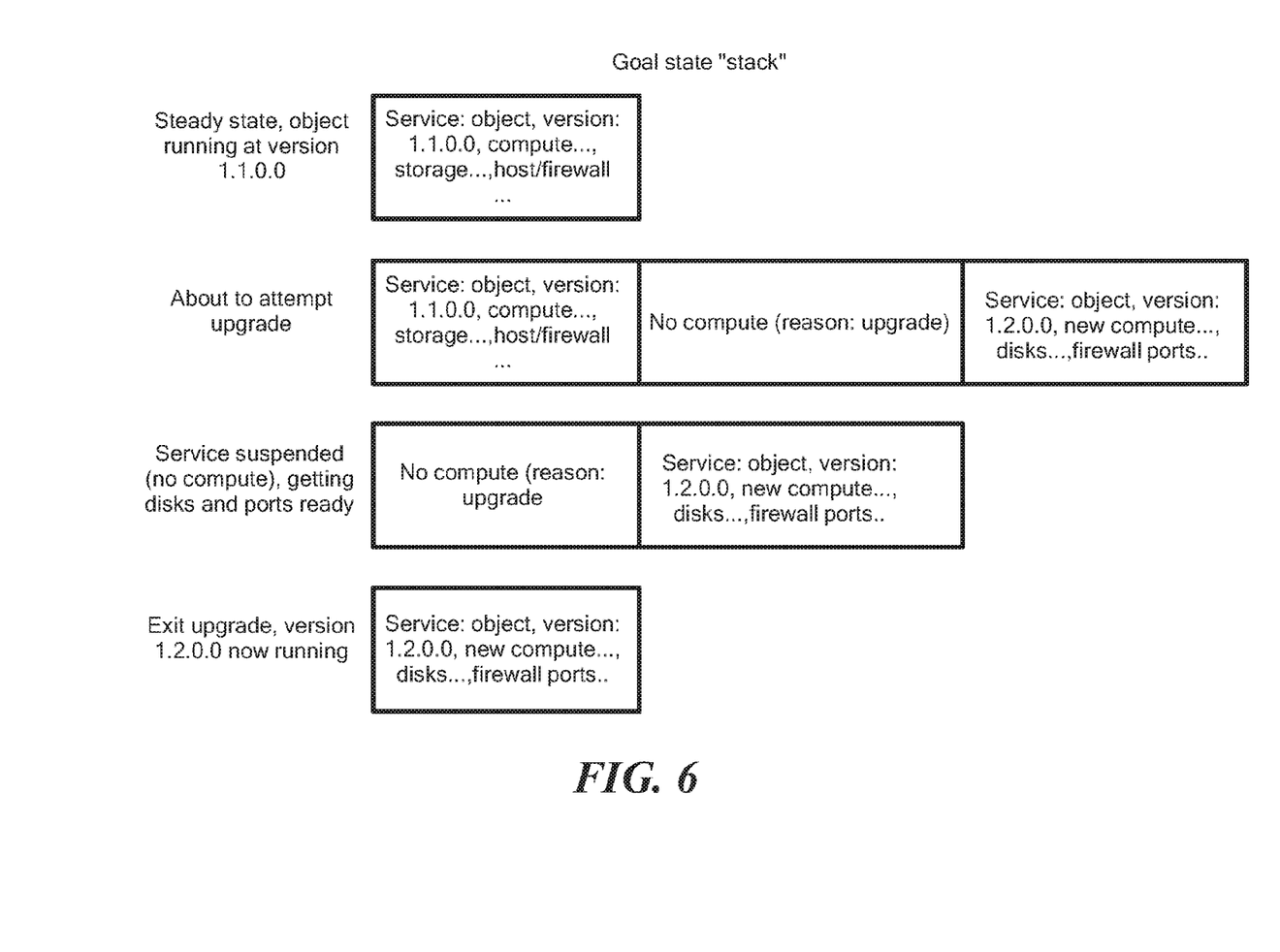
FIG. 6 is a block diagram of an example of a goal state stack during an upgrade.

FIG. 5 depicts an example of a goal state stack during a maintenance mode. FIG. 6 depicts an example of a goal state stack during an upgrade.

Figure 7:
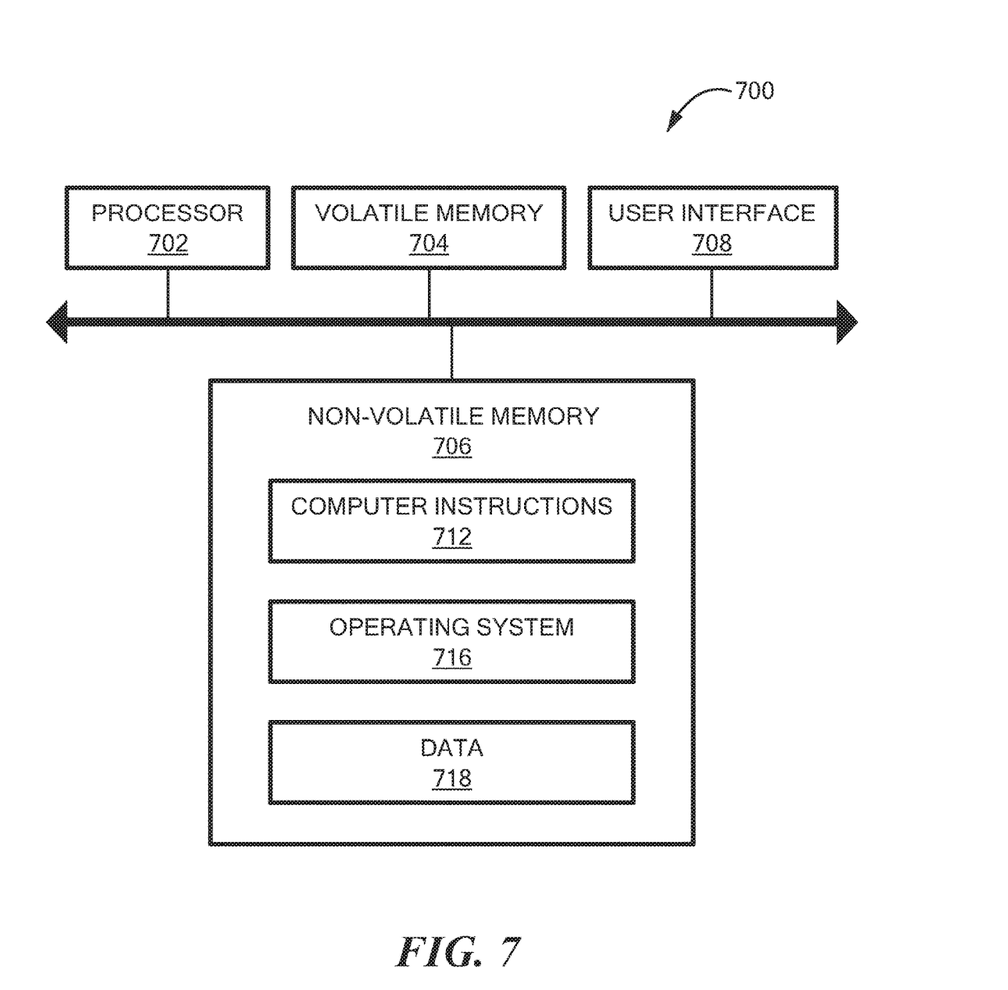
FIG. 7 is a simplified block diagram of an example of a computer on which any of the processes of FIGS. 3 and 4 may be implemented.

Referring to FIG. 7, in one example, a computer 700 includes a processor 702, a volatile memory 704, a non-volatile memory 706 (e.g., hard disk) and the user interface (UI) 708 (e.g., a graphical user interface, a mouse, a keyboard, a display, touch screen and so forth). The non-volatile memory 706 stores computer instructions 712, an operating system 716 and data 718. In one example, the computer instructions 712 are executed by the processor 702 out of volatile memory 704 to perform all or part of the processes described herein (e.g., processes 300 and 400).

The processes described herein (e.g., processes 300 and 400) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to communicate with a computer system.

However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 300 and 400 are not limited to the specific processing order of FIGS. 3 and 4, respectively. Rather, any of the processing blocks of FIGS. 3 and 4, may be combined or removed, performed in parallel or in serial, as necessary, to achieve the results set forth above.

The processing blocks (for example, in the processes 300 and 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
   performing at a lifecycle manager a first process, the first process comprising:
      determining nodes in a cluster to run an application;
      determining a difference between a cluster goal state and a cluster actual state for the application;
      determining goal state for each node; and
      sending respective goal state to agents;
   performing at each agent a second process, the second process comprising:
      determining a difference between the goal state of the node and an actual state of the node;
      determining actions to be performed based on the difference between the goal state of the node and the actual state of the node; and
      sending actions to resource managers to perform based on the difference between the goal state of the node and the actual state of the node.

2. The method of claim 1, wherein the lifecycle manager comprises:
   a first web service to handle application interface (API) requests;
   a cluster goal state driver to perform the first process;
   a cluster goal state;
   a first event library configured to generate cluster level events;
   a cluster actual state formed from actual states of each agent; and
   a persistence component comprising key/value store for a cluster state.

3. The method of claim 2, wherein each agent comprises:
   a second web service to handle application interface (API) requests;
   a goal state driver to perform the second process;
   goal states for applications running on the physical host the agent is running on;
   a second event library configured to generate host level events;
   an actual state as reported by the resource managers;
   the resource managers; and
   a local storage.

4. The method of claim 3, further comprising triggering the second process periodically.

5. The method of claim 3, further comprising triggering the second process after every event.

6. An apparatus, comprising:
   electronic hardware circuitry configured to:
      perform at a lifecycle manager a first process, the first process comprising:
         determining nodes in a cluster to run an application;
         determining a difference between a cluster goal state and a cluster actual state for the application;
         determining goal state for each node; and
         sending respective goal state to agents;
      perform at each agent a second process, the second process comprising:
         determining a difference between the goal state of the node and an actual state of the node;
         determining actions to be performed based on the difference between the goal state of the node and the actual state of the node; and
         sending actions to resource managers to perform based on the difference between the goal state of the node and the actual state of the node.

7. The apparatus of claim 6, wherein the circuitry comprises at least one of a processor, a memory, a programmable logic device or a logic gate.

8. The apparatus of claim 6, wherein the lifecycle manager comprises:
   a first web service to handle application interface (API) requests;
   a cluster goal state driver to perform the first process;
   a cluster goal state;
   a first event library configured to generate cluster level events;
   a cluster actual state formed from actual states of each agent; and
   a persistence component comprising key/value store for a cluster state.

9. The apparatus of claim 8, wherein each agent comprises:
   a second web service to handle application interface (API) requests;
   a goal state driver to perform the second process;
   goal states for applications running on the physical host the agent is running on;
   a second event library configured to generate host level events;
   an actual state as reported by the resource managers;

the resource managers; and a local storage.

10. The apparatus of claim 9, wherein the circuitry is further configured to trigger the second process periodically.

11. The apparatus of claim 9, wherein the circuitry is further configured to trigger the second process after every event.

12. An article comprising:
- a non-transitory computer-readable medium that stores computer-executable instructions, the instructions causing a machine to:
  - perform at a lifecycle manager a first process, the first process comprising:
    - determining nodes in a cluster to run an application;
    - determining differences between a cluster goal state and a cluster actual state for the application;
    - determining goal state for each node; and
    - sending respective goal state to agents;
  - perform at each agent a second process, the second process comprising:
    - determining difference between the goal state of the node and an actual state of the node;
    - determining actions to be performed based on the differences between the goal state of the node and the actual state of the node; and
    - sending actions to resource managers to perform based on the differences between the goal state of the node and the actual state of the node.

13. The article of claim 12, wherein the lifecycle manager comprises:
- a first web service to handle application interface (API) requests;
- a cluster goal state driver to perform the first process;
- a cluster goal state;
- a first event library configured to generate cluster level events;
- a cluster actual state formed from actual states of each agent; and
- a persistence component comprising key/value store for a cluster state.

14. The article of claim 13, wherein each agent comprises:
- a second web service to handle application interface (API) requests;
- a goal state driver to perform the second process;
- goal states for applications running on the physical host the agent is running on;
- a second event library configured to generate host level events;
- an actual state as reported by the resource managers;
- the resource managers; and
- a local storage.

15. The article of claim 14, wherein the instructions causing a machine to trigger the second process periodically.

16. The article of claim 14, wherein the instructions causing a machine to trigger the second process after every event.

* * * * *